United States Patent
Jang

(10) Patent No.: US 8,856,739 B2
(45) Date of Patent: Oct. 7, 2014

(54) METHOD OF UPDATING LIST OF SOFTWARE-AS-A-SERVICE AND SYSTEM FOR THE SAME

(75) Inventor: Su Min Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 111 days.

(21) Appl. No.: 13/565,394

(22) Filed: Aug. 2, 2012

(65) Prior Publication Data

US 2013/0042229 A1 Feb. 14, 2013

(30) Foreign Application Priority Data

Aug. 10, 2011 (KR) .................. 10-2011-0079540

(51) Int. Cl.
*G06F 9/44* (2006.01)
*G06F 9/445* (2006.01)

(52) U.S. Cl.
CPC ...................... *G06F 8/65* (2013.01)
USPC ........... 717/120; 717/121; 717/168; 717/169; 717/170; 717/173

(58) Field of Classification Search
None
See application file for complete search history.

(56) References Cited

U.S. PATENT DOCUMENTS

| | | | | |
|---|---|---|---|---|
| 7,925,635 | B1* | 4/2011 | Ravulur et al. | 707/688 |
| 8,056,082 | B2* | 11/2011 | Koretz et al. | 718/104 |
| 2003/0074657 | A1* | 4/2003 | Bramley, Jr. | 717/168 |
| 2006/0245564 | A1* | 11/2006 | Li et al. | 379/114.02 |
| 2009/0150545 | A1* | 6/2009 | Flores et al. | 709/224 |
| 2009/0328008 | A1* | 12/2009 | Mital et al. | 717/129 |
| 2010/0005532 | A1* | 1/2010 | Van Steenbergen et al. | 726/28 |
| 2010/0083246 | A1* | 4/2010 | Mincarelli et al. | 717/178 |
| 2010/0154035 | A1 | 6/2010 | Damola et al. | |
| 2011/0145326 | A1* | 6/2011 | Lee et al. | 709/203 |
| 2011/0313896 | A1* | 12/2011 | Nuggehalli et al. | 705/30 |
| 2012/0047499 | A1* | 2/2012 | Krzystofczyk et al. | 717/174 |
| 2012/0246297 | A1* | 9/2012 | Shanker et al. | 709/224 |
| 2013/0042229 | A1* | 2/2013 | Jang | 717/171 |
| 2013/0179984 | A1* | 7/2013 | Kumar et al. | 726/26 |

FOREIGN PATENT DOCUMENTS

| | | |
|---|---|---|
| KR | 10-2009-0092479 | 9/2009 |
| KR | 10-2009-0117792 | 11/2009 |
| KR | 10-2011-0066520 | 6/2011 |

* cited by examiner

*Primary Examiner* — Isaac Tecklu
(74) *Attorney, Agent, or Firm* — Staas & Halsey LLP

(57) ABSTRACT

A method of updating a list of SaaS and a system for the same are provided. A software server of the present invention updates a software list, in which information about software provided to a user terminal is recorded, on the basis of use information for at least one software program received from the user terminal. The software server includes a receiver that receives software use information, and a processor that determines software to be added to a software list and software to be removed from the software list to update the software list on the basis of the received software use information. Accordingly, software that is provided as a service from a server is automatically updated on the basis of software use information, thus overcoming limitations that are caused by setting a service list according to the individual determination of a manager of the server.

6 Claims, 3 Drawing Sheets

METHOD OF UPDATING LIST OF SOFTWARE-AS-A-SERVICE AND SYSTEM FOR THE SAME

CLAIM FOR PRIORITY

This application claims priority to Korean Patent Application No. 10-2011-0079540 filed on Aug. 10, 2011 in the Korean Intellectual Property Office (KIPO), the entire contents of which are hereby incorporated by reference.

BACKGROUND

1. Technical Field

Example embodiments of the present invention relate in general to a method of updating a list of software-as-a-service (SaaS) and a system for the same, and more specifically to a method and a system for the same that automatically update a list of software provided as a service to a user terminal in an SaaS environment.

2. Related Art

SaaS is software that enables a user to use only a desired service among various functions of the software. A user downloads and installs only a desired service on his/her own portable terminal, and uses the installed service. Also, a user uses functions of software operating on a server on-line over a network.

In such SaaS, due to the advancement of online data processing technology, a scheme in which a user uses a desired service online over a network when necessary is attracting more attention than a scheme in which a user downloads and installs only a desired service on his/her own portable terminal.

That is, a server provides various functions of software to a plurality of customers by using one platform, and a user uses desired software online over a network when necessary and then pays charges equal to the amount of used software. This is a business model in which a user receives software as a service over a network and pays charges equal to the amount of used software as in commercial electricity and gas.

For the above-described service, it is very important to select a list of software that is provided as a service from an online software server. However, since a manager of the online software server or some specific users select(s) a list of software provided as a service, users of the service cannot appropriately reflect desired software in the server at an appropriate time. Also, even when software of the online software server is well selected at an initial stage, unnecessary software accumulates in the server over time.

SUMMARY

Accordingly, example embodiments of the present invention are provided to substantially obviate one or more problems due to limitations and disadvantages of the related art.

Example embodiments of the present invention provide a method of updating a list of SaaS and a system for the same.

Example embodiments of the present invention also provide a method and a system for the same that automatically update a list of software provided as a service to a user terminal in an SaaS environment.

In some example embodiments, a software server that updates a software list, in which information about software provided to a user terminal is recorded, on the basis of use information for at least one software program received from the user terminal, includes: a receiver configured to receive the software use information; and a processor configured to determine software to be added to the software list and software to be removed from the software list to update the software list on the basis of the received software use information.

In other example embodiments, a method of updating a list of software-as-a-service (SaaS), which is performed by a user terminal that is connected to a software server and receives a software service, includes: collecting use information for at least one software program installed in the user terminal; transmitting the collected software use information to the software server; and receiving a list of software that has been updated on the basis of the software use information, from the software server, and transmitting a request for at least one software program in the software list.

In still other example embodiments, a method of updating a list of software-as-a-service (SaaS), which is performed by a software server that updates a software list in which information about software provided to a user terminal is recorded, includes: collecting use information for at least one software program installed in the user terminal from the user terminal; determining software to be added to the software list and software to be removed from the software list to update the software list on the basis of the software use information; receiving software, which is added to the software list, from a software provision server; and providing the updated software list to the user terminal.

BRIEF DESCRIPTION OF DRAWINGS

The above and other features and advantages of the present invention will become more apparent by describing in detail example embodiments of the present invention with reference to the accompanying drawings, in which.

DESCRIPTION OF EXAMPLE EMBODIMENTS

Figure 1:
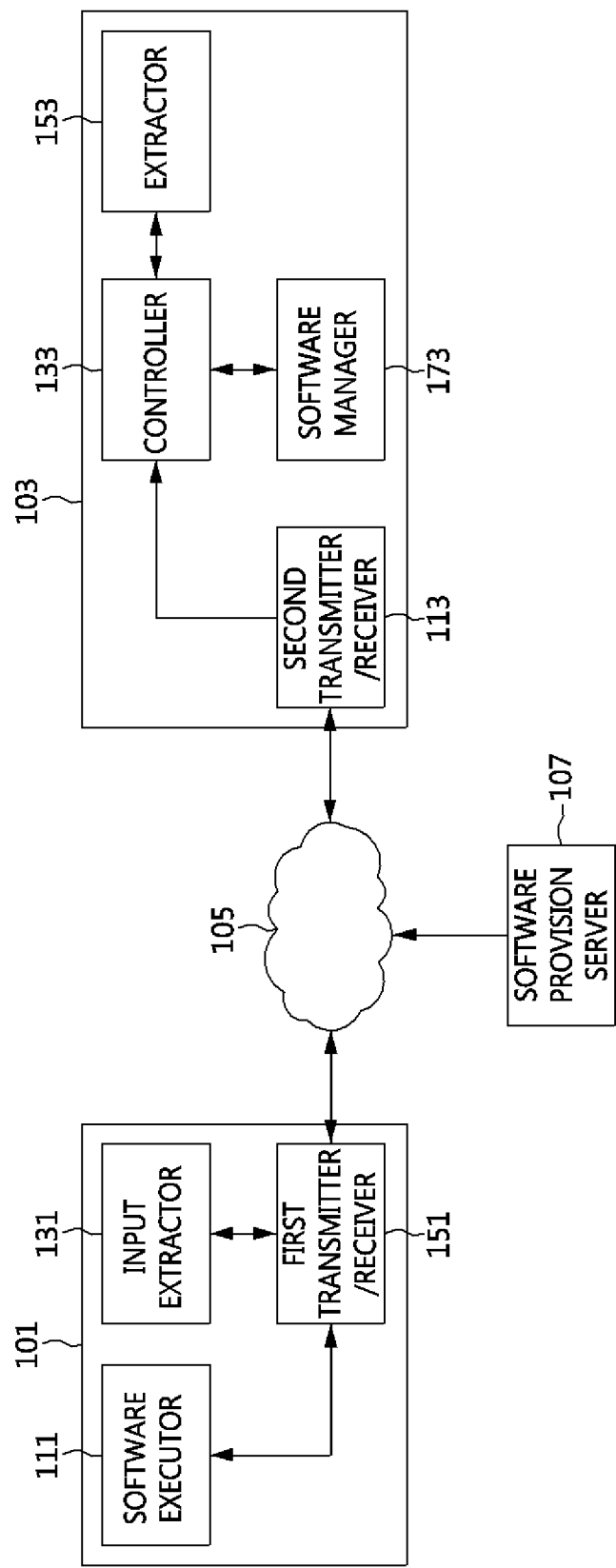
FIG. 1 schematically illustrates an internal structure of a conceptual diagram in which a user terminal receives split execution software as a service from a software server in a general system for updating a list of SaaS.

The invention may have diverse modified embodiments, and thus, example embodiments are illustrated in the drawings and are described in the detailed description of the invention. However, this does not limit the invention within specific embodiments and it should be understood that the invention covers all the modifications, equivalents, and replacements within the idea and technical scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings.

Before describing a method of updating a list of SaaS and a system for the same according to an embodiment of the present invention, a general software service method will be described. A server-based software service that supports a plurality of users is largely divided into two types of services. First, streaming format software service transmits the graphical result of a program (which is executed in a server) to a client in streaming format, thereby providing a service. Second, a split execution software service splits a plurality of commands associated with the graphics work of a software program that is executed in a server, and transmits the split commands to a client, thereby providing a service.

FIG. 1 schematically illustrates an internal structure of a conceptual diagram in which a user terminal receives split execution software as a service from a software server in a general system for updating a list of SaaS.

Referring to FIG. 1, the general system for updating a list of SaaS includes a user terminal 101 that enables a user to use software, a software server 103 that provides the software to the user terminal 101, a communication network 105, and a software provision server 107 that enables the download of application software over the communication network 105 such as the wired/wireless Internet.

The user terminal 101 may include a first transmitter/receiver 151, a software executor 111, and an input extractor 131. The first transmitter/receiver 151 may request the execution of split execution software from the software server 103, and receive the split execution software from the software server 103.

The input extractor 131 extracts input information received through the first transmitter/receiver 151, such as a keyboard or a mouse. The software executor 111 determines split execution software to be executed in the software server 103 on the basis of the input information extracted by the input extractor 131. The software server 103 processes the graphics work of software that is received through the first transmitter/receiver 151, and a display unit (not shown) displays the processed graphics work.

The software server 103 may include a second transmitter/receiver 113, a controller 133, a software manager 173, and an extractor 153. The second transmitter/receiver 113 receives input information that is transmitted by the user terminal 101. Also, the second transmitter/receiver 113 transmits to the user terminal 101 the graphics work of split execution software extracted by the below-described extractor 153 according to the input information received from the user terminal 101.

The software manager 173 manages a plurality of users that receive a split execution software service, a process that tracks and manages a split execution software process, and the setting of software that stores the final setting information of split execution software used by each of the users. The extractor 153 extracts the graphics work of split execution software to be transmitted to the user terminal 101 on the basis of information stored in the software manager 173, according to control by the controller 133.

When the user terminal 101 requests the execution of split execution software from the software server 103, the communication network 105 relays the graphics work of software transmitted from the software server 103 to the user terminal 101.

The software provision server 107 may provide software required by the software server 103 to the software server 103 and store a plurality of software programs manufactured by a plurality of software manufacturers.

In this way, split execution software that is provided as a service to the user terminal 101 through the software server 103 is selected by a manager of the software server 103, and then provided as a service to the user terminal 101. However, among a plurality of user software programs installed in the user terminal 101 according to the needs of users, software used by a plurality of users in common cannot be reflected in the software server 103 at an appropriate time.

Moreover, even if split execution software of the software server 103 is well selected at an initial stage, unnecessary software accumulates in the software server 103 over time. Therefore, to overcome such limitations, a system for updating a list of SaaS according to an embodiment of the present invention will be described below.

Figure 2:
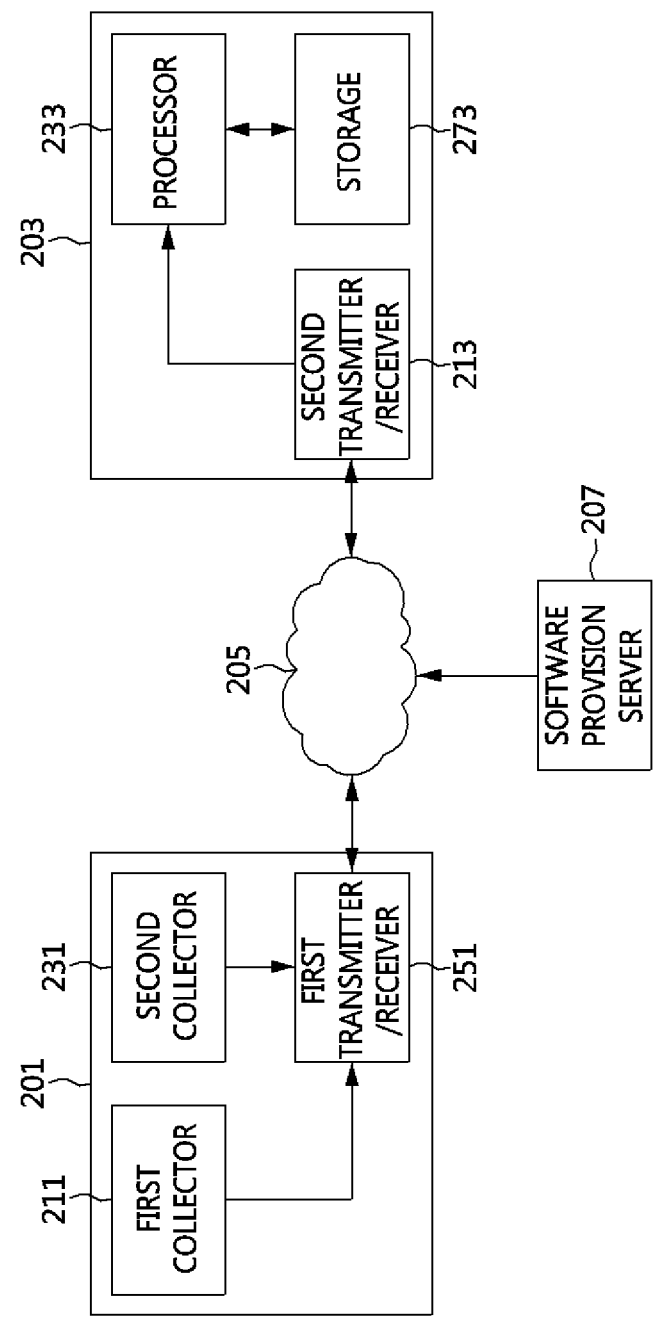
FIG. 2 is a block diagram schematically illustrating an internal structure of a system for updating a list of SaaS according to an embodiment of the present invention.

FIG. 2 is a block diagram schematically illustrating an internal structure of a system for updating a list of SaaS according to an embodiment of the present invention.

Referring to FIG. 2, the system for updating a list of SaaS according to an embodiment of the present invention includes a user terminal 201, a software server 203, a communication network 205, and a software provision server 207.

The user terminal 201 may include a first transmitter/receiver 251, a first collector 211, and a second collector 231. Each of the first and second collectors 211 and 231 collect information on what software is used and how many times it is used by a user through a client terminal. Therefore, the first and second collectors 211 and 231 may be separately configured as illustrated in FIG. 2, or may be configured as one body.

Moreover, the user terminal 201 may include a portable terminal, a personal digital assistant (PDA), a portable multimedia player (PMP), a personal computer (PC), or the like, but is not limited thereto.

Each of the first and second collectors 211 and 231 extracts software use information such as program information of software installed in the user terminal 201, the number of times a user used the software, and a time for which the user used the software, and transmits the extracted information to the software server 203 through the first transmitter/receiver 251.

The software server 203, which receives the software use information from the user terminal 201 and selects a software list, may include a second transmitter/receiver 213, a processor 233, and a storage 273. The second transmitter/receiver 213 receives the software use information from the user terminal 201, and the processor 233 stores the software use information in the storage 273.

At this point, the processor 233 stores the software use information as multi-attribute data (which includes total time, total number of uses, and average use time, wherein a user has used software for a specific duration) in the storage 273. Also, the processor 233 controls the second transmitter/receiver 213 to receive software to be updated in the software server 203 from the software provision server 207.

The processor 233 receives the software use information stored in the storage 273 and selects a list of software to be newly provided as a service from the software server 203 and a list of software to be removed. Furthermore, the processor 233 reflects information on the selected software list in the software server 203 that is actually improved. An operation in which the processor 233 selects a list of software to be newly provided as a service from the software server 203 will be described in more detail in the below description of FIG. 4.

When the user terminal 201 transmits the software use information to the software provision server 207, the user terminal 201 receives software from the software server 203, or the software server 203 receives software to be reflected in the software server 203 from the software provision server 207, the communication network 205 performs a relay.

The communication network 205 may be configured as a wired communication network or a wireless communication network. When the communication network 205 is the wired communication network, the communication network 205 may include a wired local area network (LAN), but is not limited thereto. Also, when the communication network 205 is the wireless communication network, the communication network 205 may include code-division multiple access (CDMA), time division multiple access (TDMA), and global system for mobile communication (GSM), but is not limited thereto.

The software provision server 207 may provide software required by the software server 203 to the software server 203, and store a plurality of software programs manufactured by a plurality of software manufacturers.

Figure 3:
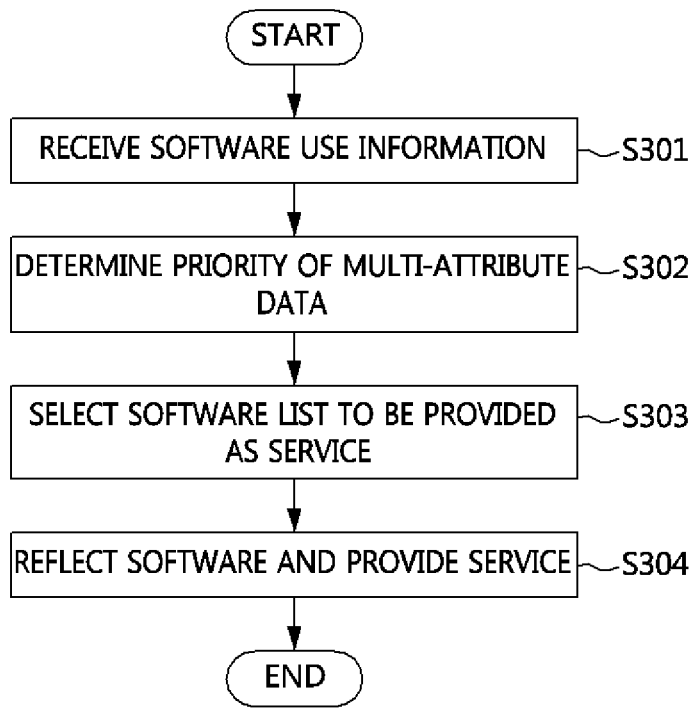
FIG. 3 is a flowchart illustrating a method in which the system for updating a list of SaaS according to an embodiment of the present invention updates a software list.

FIG. 3 is a flowchart illustrating a method in which the system for updating a list of SaaS according to an embodiment of the present invention updates a software list.

Referring to FIG. 3, the software server 203 receives use information of software (which is installed in the user terminal 201) transmitted from the user terminal 201 in operation S301. In operation S302, the software server 203 determines priority of multi-attribute data on the basis of the software use information, which is multi-attribute data including total time, total number of uses, and average use time, in which a user has used software for a specific duration. The software server 203 selects a list of software to be actually provided as a service in operation S303.

After the software server 203 has selected the software list, the software server 203 downloads a service software execution file to be added, and reflects the selected software in the software server 203 to provide the software as a service in operation S304.

Figure 4:
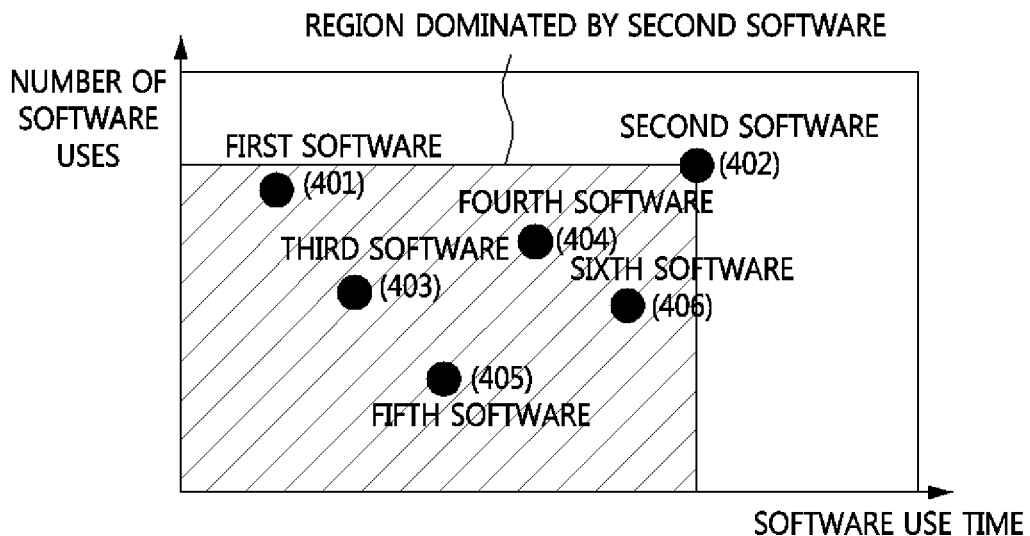
FIG. 4 is a diagram for describing an example of a method in which a processor of a software server selects a software list by using a skyline query in the system for updating a list of SaaS according to an embodiment of the present invention.

FIG. 4 is a diagram for describing an example of a method in which a processor of a software server selects a software list by using a skyline query in the system for updating a list of SaaS according to an embodiment of the present invention.

In the embodiment illustrated in FIG. 4, six software programs are displayed on a graph according to a software use time and number of uses, and a detailed embodiment is illustrated in which a user selects preferred software though the skyline query for the six software programs. Here, the skyline query denotes finding a set of data, among data having multiple attributes, that is not dominated by other data with respect to all attributes.

That is, data that is not dominated with respect to all attributes becomes a user's preference data. Domination among a plurality of data sets having multiple attributes is determined according to the magnitudes of the data attributes. Specifically, when all attributes of a first set of data are less than or equal to those of a second set of data, and at least one attribute of the first set of data is less than one attribute of the second set of data, then the first data dominates the second data.

Referring to FIG. 4, the X-axis of the graph indicates a software use time, and the Y-axis of the graph indicates number of software uses. When displaying first software 401 to sixth software 406 in a multidimensional coordinate space according to a software use time and number of software uses, six points 401 to 406 are marked on the graph.

In FIG. 4, the graph is relevant to a software use time and number of software uses, and thus, as a coordinate value increases, corresponding software may be referred to as user-preferred software. In this case, a use information attribute having a high coordinate value has higher priority than a use information attribute having a low coordinate value, and user-preferred software may be determined. In another embodiment, although not shown, in a graph that is relevant to a software use time and software, and as a coordinate value decreases with respect to software prices, corresponding software is determined as user-preferred software.

To this end, the processor 233 applies weight values by attribute to a use information attribute value to calculate the coordinate value of a use information attribute. For example, the processor 233 calculates a coordinate value without changing the directionality of coordinates, for an attribute denotes that corresponding software is user-preferred software as a coordinate value increases. On the other hand, the processor 233 calculates a coordinate value by changing the directionality of coordinates, for an attribute denotes that corresponding software is user-preferred software as a coordinate value decreases.

In this way, the processor 233 calculates a coordinate value by changing the directionality of coordinates according to use information attribute values. Accordingly, even when an attribute (denoting that corresponding software is user-preferred software as a coordinate value increases) is disposed on the X-axis and an attribute (denoting that corresponding software is user-preferred software as a coordinate value decreases) is disposed on the Y-axis, software may be accurately displayed in the multidimensional coordinate space.

When a use information attribute having a high coordinate value has higher priority than a use information attribute having a low coordinate value, and second software 402 is greater than first software 401 and third to sixth software 403 to 406 in terms of software use time and number of software uses, the processor 233 determines that the second software 402 dominates the first software 401 and the third to sixth software 403 to 406 according to software use time and number of software uses.

In this case, the first software 401 and the third to sixth software 403 to 406 that are dominated by the second software 402 are not user-preferred software. Thus, the processor 233 may remove the first software 401 and the third to sixth software 403 to 406 and select user-preferred software by computing the result of the skyline query, which is the remaining second software 402.

In this way, the processor 233 may determine priority of a newly-added service software list through a skyline query, on the basis of multi-attribute data which includes total time, total number of uses, and average use time, wherein a user has used software for a specific duration.

By using the method of updating a list of SaaS and the system for the same according to the embodiment of the present invention, software that is provided as a service from a server is automatically updated on the basis of software use information, thus overcoming limitations caused by setting a service list according to the individual determination of a manager of the server.

Moreover, the present invention provides a tool and equipment for removing unnecessary software (which is not frequently used by users) from among a plurality of software programs provided as a service from a service software server, on the basis of software use information with respect to users.

While example embodiments of the present invention and their advantages have been described in detail, it should be understood that various changes, substitutions and alterations may be made herein without departing from the scope of the invention.

What is claimed is:

1. A software server that updates a software list, in which information about software provided to a user terminal is recorded, based on use information for at least one software program received from the user terminal, the software server comprising:
    a receiver configured to receive the software use information; and
    a processor configured to determine software to be added to the software list and software to be removed from the software list to update the software list based on the received software use information, and
    wherein, the software use information comprises at least one use information attribute,
    a list update operation, which is performed by the processor, displays software in a multidimensional coordinate space according to software use information attributes and, when a coordinate value of at least one use information attribute of a first software is greater than or equal to a coordinate value of at least one use information attribute of a second software in a plurality of software programs comprised in the software list, and a coordinate value of at least one use information attribute of the first software is greater than a coordinate value of at least one use information attribute of the second software, removes the second software from the software list, and
    the coordinate value of the use information attribute is calculated by determining directionality according to a use information attribute value.

2. The software server of claim 1, wherein the use information attribute of the software comprises at least one of software profile information, a total number of uses, and a total time that the software has been used by the user terminal.

3. A method of updating a list of software-as-a-service (SaaS), which is performed by a user terminal that is connected to a software server and receives a software service, the method comprising:
    collecting use information for at least one software program installed in the user terminal;
    transmitting software use information collected to the software server; and
    receiving a list of software that has been updated based on the software use information, from the software server, and transmitting a request for at least one software program in the software list, and
    wherein, the software use information comprises at least one use information attribute,
    software is displayed in a multidimensional coordinate space according to software use information attributes, and when a coordinate value of at least one use information attribute of first software is greater than or equal to a coordinate value of at least one use information attribute of second software in a plurality of software programs comprised in the software list, and a coordinate value of at least one use information attribute of the first software is greater than a coordinate value of at least one use information attribute of the second software, the second software is removed from the software list, and
    the coordinate value of the use information attribute is calculated by determining directionality according to the use information attribute value.

4. The method of claim 3, wherein the use information attribute of the software comprise at least one of software information, total number of software uses, and total software use time.

5. A method of updating a list of software-as-a-service (SaaS), which is performed by a software server that updates a software list in which information about software provided to a user terminal is recorded, the method comprising:
    collecting use information for at least one software program installed in the user terminal from the user terminal;
    determining software to be added to the software list and software to be removed from the software list to update the software list on the basis of the software use information;
    receiving software, which is added to the software list, from a software provision server; and
    providing the updated software list to the user terminal, and
    wherein, the software use information comprises at least one use information attribute, and
    the updating of the software list comprises displaying software in a multidimensional coordinate space according to the software use information and, when all use information attributes on first software are less than or equal to all use information attributes on second software in a plurality of software programs comprised in the software list, and at least one use information attribute of the first software is less than at least one use information attribute of the second software, removing the second software from the software list.

6. The method of claim 5, wherein the use information attributes of the software comprise at least one of software information, total number of software uses, and total software use time.

* * * * *